Jan. 14, 1958 N. R. DE WITT 2,819,810
VEHICLE LOAD HANDLER
Filed July 7, 1955 3 Sheets-Sheet 2
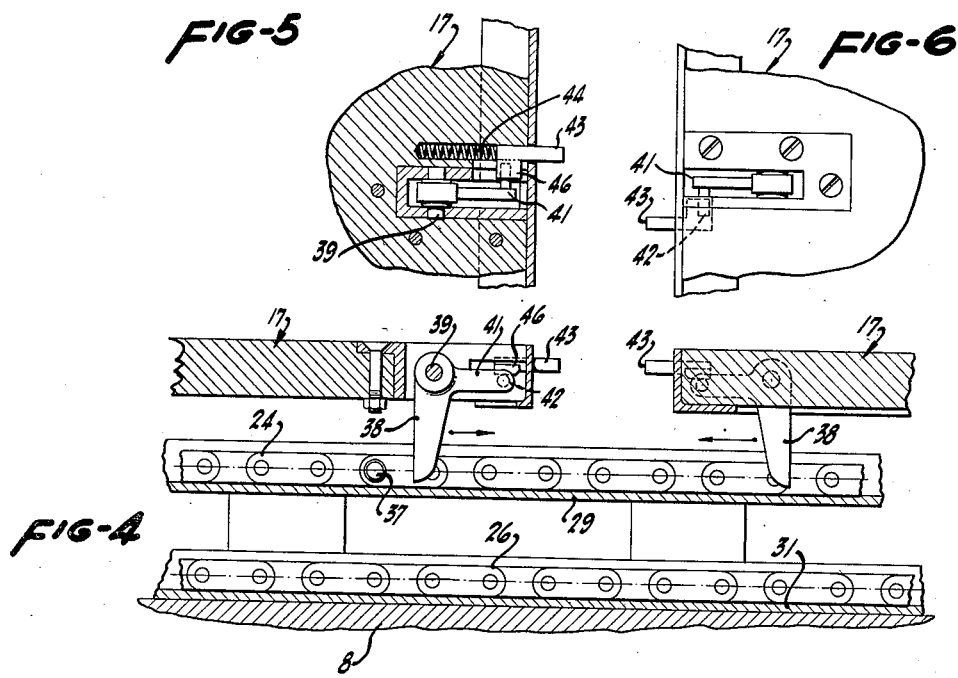
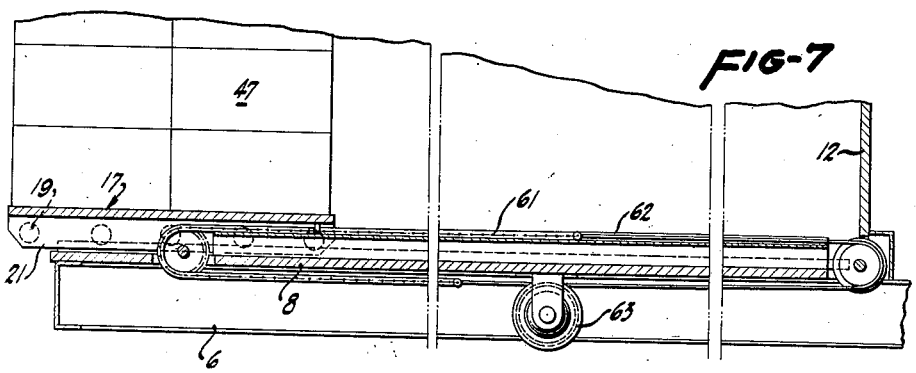
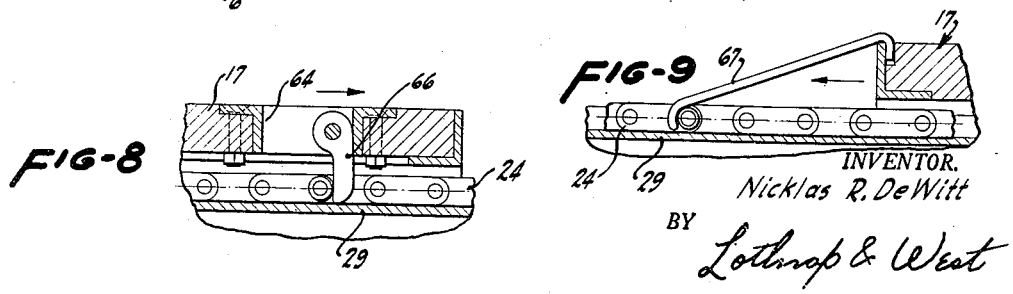
INVENTOR.
Nicklas R. DeWitt
BY
Lothrop & West
Attorneys Jan. 14, 1958 N. R. DE WITT 2,819,810
VEHICLE LOAD HANDLER Filed July 7, 1955 3 Sheets-Sheet 3

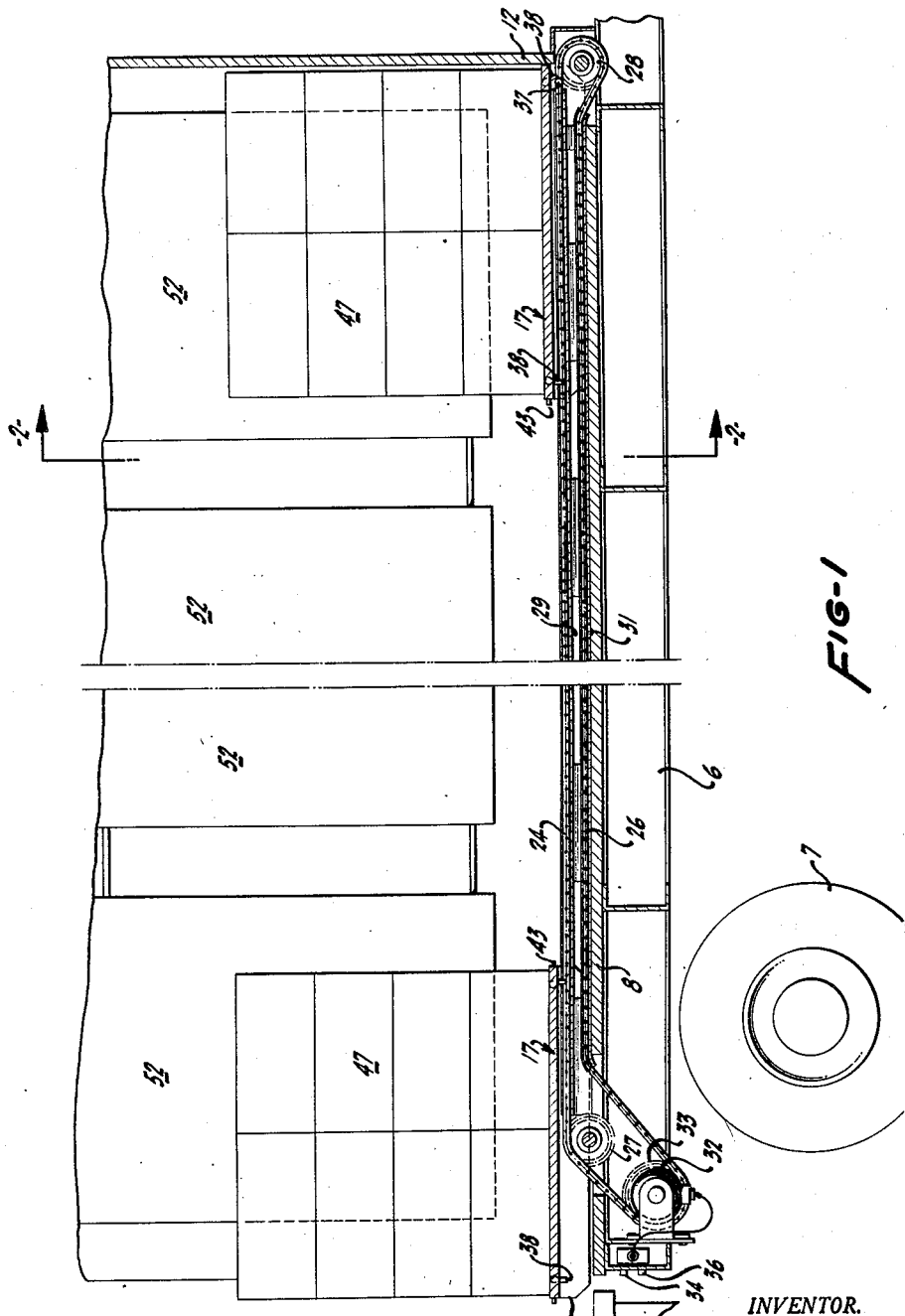

INVENTOR.
Nicklas R. DeWitt
BY
Lothrop & West
Attorneys

United States Patent Office 2,819,810
Patented Jan. 14, 1958

2,819,810

VEHICLE LOAD HANDLER

Nicklas R. DeWitt, Medford, Oreg.

Application July 7, 1955, Serial No. 520,431

2 Claims. (Cl. 214—516)

My invention relates to means for handling cargo or lading particularly in connection with hauling by motor truck and by truck trailer and is concerned with the facilitation of the loading and unloading or the stowing and removal of cargo, particularly in box or crate form.

It is customary nowadays in loading and unloading a truck or a trailer hauling case goods, for example, for the goods to be manually lifted from a loading dock into the truck body or trailer body and to be manually piled at the forward end thereof and then progressively toward the rearward end thereof until the cargo space is full. In unloading, the reverse procedure is followed with each carton or case being individually and manually lifted and transported. Sometimes dollies or hand trucks are utilized to assist but, in general, a large amount of manual labor is involved both in loading and unloading.

It is therefore an object of my invention to provide a vehicle load handler which removes much of the manual handling both from the loading and unloading operation.

Another object of my invention is to provide a mechanism which can readily be incorporated in a truck body or a trailer body to move the lading into its stowed carrying position and to remove such lading at the end of its transportation.

Another object of the invention is to provide a vehicle load handler which operates by power furnished from the vehicle itself.

Another object of the invention is to provide a means for holding the lading so loaded in position during transport to guard against damage and shifting.

Another object of the invention is to provide a vehicle load handler which is easily and simply operated by the vehicle operator without requiring assistance.

Another object of the invention is to provide a vehicle load handler which is effectively utilized not only in a vehicle but can also be utilized on a loading platform or in a warehouse.

A still further object of the invention is to provide a vehicle load handler which is compatible with presently standard systems of load handling.

Another object of the invention is to provide in general an improved manner of handling lading in connection with motor vehicles.

Other objects, together with the foregoing, are attained in the embodiments of the invention described in the accompanying description and illustrated in the accompanying drawings, in which Figure 1 is a cross section on a longitudinal vertical plane through a vehicle provided with the load handler of my invention, a portion of the vehicle being broken away to reduce the size of the figure.

Figure 4 is a fragmentary detail to an enlarged scale showing part of the conveyor structure of Figure 1 with one form of latch lug construction.

Figure 5 is a plan, partly in section, of the structure shown in the left-hand side of Figure 4.

Figure 6 is a plan, parts being broken away, of a part of the structure shown at the right-hand portion of Figure 4.

Figure 7 is a longitudinal section on a vertical plane somewhat similar to Figure 1 but showing a modified form of conveyor arrangement.

Figure 8 is a cross section on a vertical longitudinal plane of another form of lug and conveyor interengagement.

Figure 9 is a side elevation of a different form of interconnection between a pallet and the conveyor.

Figure 2:
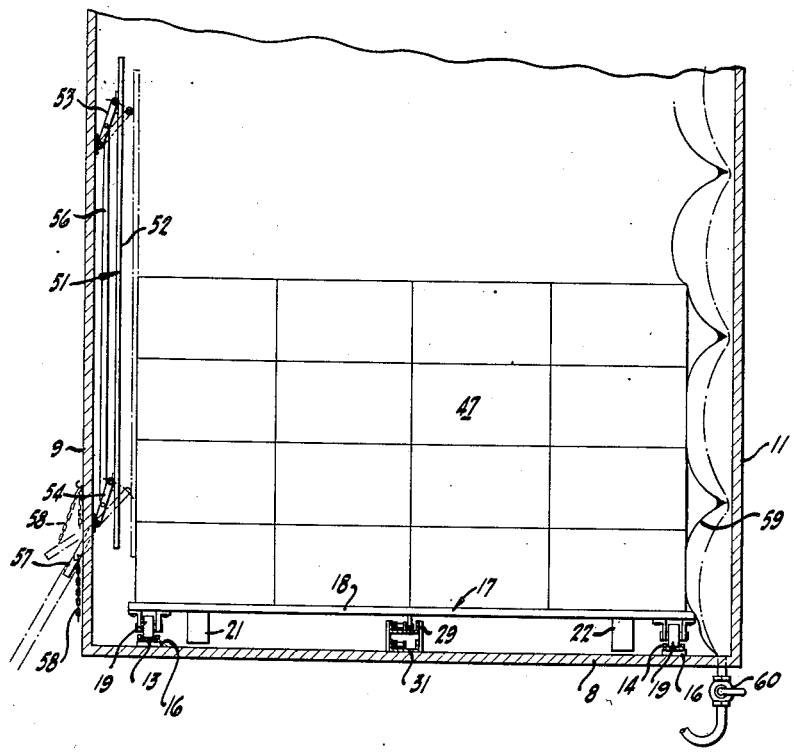
Figure 2 is a cross section, the plane of which is indicated by the line 2—2 of Figure 1.

While the vehicle load handler of my invention is susceptible of embodiment in a number of different forms, it has successfully been incorporated substantially as shown in the accompanying drawings. It is to be understood, however, that the drawings and description are illustrative of but a few of the many different forms which the invention may take depending upon the particular environment in which it is to be utilized and other factors. In the present instance, the load handler is incorporated in a vehicle such as a trailer or truck body having a frame 6 supported on ground engaging wheels 7. The construction of the trailer frame 6 is substantially standard and is provided with the customary air supply for brakes to the wheels 7 or with the customary electric supply for various lights and controls. It may also be supplied with a source of hydraulic fluid under pressure from the power plant of the truck to which the truck body or trailer is connected. The frame 6 is of the customary construction and supports a general planar floor 8 which has a predetermined width as it extends between the upright planes 9 and 11 of the vehicle body. The floor 8 extends also from the rearmost portion of the frame 6 substantially to a forward wall 12 at the leading end of the vehicle. Preferably, the floor is constructed of wood or metal plate and, for the most part, is smooth and regular in contour.

In accordance with the invention, the floor 8 is provided with at least a pair of longitudinally extending rails 13 and 14, preferably channel shaped in cross section and extending from a point close to the rear of the floor 8 to another point close to the forward end thereof. Preferably, the channels or rails 13 and 14 are mounted on spacers 16 so that they are disposed at a slight elevation above the general plane of the floor 8. Designed to co-operate with the vehicle body are pallets 17 provided in multiple and preferably of a length so that they substantially fill the space within the vehicle body when all of them are present. Each of the pallets 17 is likewise of a width somewhat less than the width of the vehicle body between the side frames 9 and 11. Each pallet also preferably includes a base 18 preferably of wood or metal or rectangular configuration and provided adjacent each of its corners with a roller wheel 19. The roller wheels are disposed so that they fit accurately into the tracks 13 and 14 so that the base 18 is supported thereby.

Figure 3:
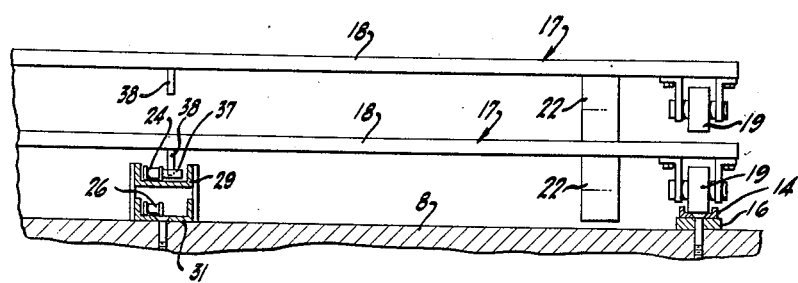
Figure 3 is an enlarged view similar to Figure 2 with portions broken away and showing pallets in stacked relationship.

Also depending from the base 18 of the pallet are supports or skids 21 and 22 which are preferably of wood secured to the base 18 near the roller wheels 19. The vertical height of the skids or supports is somewhat greater than that of the rollers 19 but the distance that the skids depend from the base 18 is less than the combined dimension of the wheels 19 and the elevated tracks 14. As shown particularly in Figures 2 and 3, the supports 21 do not depend quite to the plane of the floor 8 when the pallet is resting on its rollers 19 with the rollers at their bottom tangent to the elevated tracks 13 and 14. With this construction, especially as shown in Figure 3, when the pallet is supported by its rollers, the supports 21 clear the floor 8 and the pallet can readily be rolled. On the other hand, as shown by the stacked pallet in Figure 3, when the pallet rests upon its supports 21 and 22 in some location other than with the rollers in the tracks 14, the entire weight of the pallet and the lading upon it is borne upon the supports and is not on the rollers 19 so that such rollers are not then effective.

As a variation, if ordinary or standard pallets with supports but without rollers are preferred, the floor 8 can be provided with rows of rollers projecting upwardly far enough so that the supports of pallets resting upon and movable over such rollers adequately clear the floor.

This construction is useful under several circumstances. When the pallet is first loaded in a warehouse or on a loading dock, for example, it rests upon its supports or skids 21 and 22 so that no load is borne by the rollers 19. The pallet is then stable and cannot be readily be dislodged but can easily be loaded in the customary way and can be transported from place to place by a fork lift truck in the customary fashion. If the pallet is also to be held without dislodgement in the vehicle body, it is placed in the vehicle body with the supports 21 and 22 resting on the floor 8 and with the rollers 19 displaced laterally to one side of the tracks 13 and 14. On the other hand, if the pallet is to be moved on the truck body, then the rollers are engaged with the tracks, as shown in Figure 2, and the pallet is then movable readily since the supports or skids 21 and 22 are out of contact with the floor 8.

In order that a loaded pallet which has been set upon the rearmost portion of the truck rails, as shown at the left end of Figure 1, can be advanced readily within the vehicle body, I provide a power conveyor means for that purpose. Disposed generally parallel to the rails 13 and 14 are the upper run 24 and the lower run 26 of a conveyor chain at its opposite ends passing around idlers 27 and 28 and between its ends being guided in channels 29 and 31 appropriately secured to and supported on the vehicle floor 8. Intermediate the ends, the conveyor runs are guided in the channels which are appropriately shaped for that purpose.

In order to drive the conveyor chain, there is provided a drive motor 32 of any suitable sort having a sprocket 33 engaging the chain as it rounds its rearward end. The motor 32 is preferably electric since electricity is more normally available both at the rear of a truck body and at the rear of a trailer body being derived normally from the generator of the vehicle engine or from a storage battery thereon. However, air is usually available also for brakes or other auxiliary uses on the truck or trailer and the motor 32 can as readily be an air motor. Also, in some instances, hydraulic fluid is available under pressure so that the motor 32 can be an hydraulic motor. In any case, the motor has sufficient power to drive the conveyor. The motor is likewise reversible under the influence of control buttons 34 and 36 at convenient locations on the vehicle frame 6 so that the conveyor chain can be advanced or retracted as desired.

At suitable intervals in its length, the conveyor chain is provided with one or more extension arms 37 projecting so that it or they can be intercepted by lugs 38 depending from the pallet 17. In the form especially shown in Figures 4, 5 and 6, each of the lugs 38 is provided with a pivot mounting 39 adjacent one end of the pallet, there being two such lugs per pallet. The lever of which the lug 38 is a part has a forward extension 41 with a pin 42 thereon normally held depressed by a bumper 43 normally projected by a spring 44. When the bumper 43 is depressed, a lug 46 on the bumper is moved into a position so that the lever lug 38 is free to swing about the pin 39 but when the bumper 43 is projected, the depending lug 38 is held against upward swinging movement. However, some retrograde swinging movement is permitted to the lug 38 since the pin 42 can drop freely from abutment with the extension 46. Normally, however, the weight of the lug 38 holds it downward in substantially the position shown in Figure 4.

In the operation of this device, after the first pallet 17 has been placed with its lading 47 such as case goods, on the rear of the floor 8 by means of a fork lift or other device and with the wheels 19 in the tracks 13 and 14, the operator pushes the forward button 34 which starts the motor and advances the upper run 24 of the conveyor chain. Under those circumstances, the projecting arm 37 engages the depending lug 38 and since the lug cannot swing upwardly, the pallet 17 is moved as far forward as the operator requires. If the operator does not release the button 34 previous thereto, the pallet advances until the bumper 43 contacts the forward wall 12 and permits the projecting arm 37 to rotate the lug in a counter-clockwise direction, as seen in Figure 4, so that the pallet is then released in the foremost position in the vehicle body. Similarly, a subsequently positioned pallet 17 is advanced into the next succeeding position behind the first leading pallet 17, being automatically disengaged when the bumper 43 is moved and the depending lug 38 is free to release. In this fashion, pallets are put into the truck or trailer body until it is full. The button 34 is then released and the mechanism is stopped.

In order to preclude shifting of the load so disposed, I preferably provide one or both side frames 9 and 11 of the vehicle body with a movable side wall 51. The wall comprises preferably a planar sheet 52 which is mounted on pivoted parallel links 53 and 54 secured to the side frame 9 of the vehicle body. The links 53 and 54 are joined by a connecting rod 56 and a manual operating lever 57 which can be held in place by a chain 58. When the lading is appropriately disposed, one or both of the side walls 51 are moved into the position shown by the dotted lines in Figure 2 and the lading is clamped in position for transport. At the destination, the levers 57 and the chains 58 are released so that the plates 51 are retracted into the position shown by the full lines in Figure 2.

As an alternative to the sheet 52, the movable side wall, usable on one or both sides, may take the form of a flexible panel 59 or mattress expandable or inflatable by air from the source normally available on the vehicle. A manual valve 60 permits the inflatable panel 59 to be exhausted and collapsed out of contact with the lading (dotted line position in Figure 2) or to be filled and expanded into tight, holding engagement with the lading (full line position in Figure 2).

When the load is to be discharged, the side panels 52 or 59 are withdrawn from their load holding position and the operator then utilizes the button 36 to energize the motor 32 in a reverse direction. Under these circumstances, the projecting arm 37 on the reversely operating upper run of the conveyor engages the depending rearward lug 38 at the rearmost pallet 17 and moves it to the rearmost position on the rails 13 and 14 from whence it can be removed by a fork lift truck or comparable means. The conveyor is then advanced so that the projecting arm 37 lies just ahead of the depending lug 38 at the rearmost end of the next succeeding pallet which is itself then removed until the entire vehicle body has been emptied. In this fashion, the vehicle is readily loaded and unloaded by power.

As an alternative construction, the chain conveyor as shown in Figure 7 can include a chain length 61 which is joined at its ends to a cable 62 wrapped around a driving drum 63 driven by a suitable motor. This structure has the advantage of utilizing less chain and of permitting the mounting of the drive mechanism away from the rearward portion of the vehicle frame. The operation otherwise is exactly identical with that previously described.

Also, as disclosed in Figure 8, a simplified lug construction can be employed in that each of the pallets 17 may be provided with a socket 64 in which a depending pivoted lug 66 is provided so that the lug can move freely in a clockwise direction and abut the socket side in a counter clockwise direction.

As shown in Figure 9, a very simple removable and manually positionable hook 67 can be utilized for assisting in withdrawing the pallets if desired.

What is claimed is:

1. A vehicle load handler for a vehicle having a floor and side framing upstanding from said floor comprising a pallet, wheels on said pallet, means on said floor for supporting said pallet on said wheels, means for conveying said pallet along said floor, wall panels, means for mounting said wall panels on said side framing for relative movement toward each other, and means for pressing said wall panels against lading on said pallet to arrest movement of said pallet along said floor.

2. A vehicle load handler comprising a frame, a planar floor on said frame, a pair of parallel rails laid on the top of said planar floor, a channel laid on the top of said planar floor between and parallel to said rails and extending to a greater height than said rails, a conveyor chain movable longitudinally in said channel, a pallet having a planar base parallel to said planar floor and overlying said rails, wheels on said pallet base engaging said rails, a pair of skids depending from said pallet base parallel to said rails and between said wheels, said skids terminating at the bottom short of said planar floor but below the bottom of said wheels, and means on said conveyor chain for engaging said pallet to move said pallet with said conveyor chain.

References Cited in the file of this patent

UNITED STATES PATENTS

| | | |
|---|---|---|
| 1,870,573 | Kuchar | Aug. 9, 1932 |
| 1,963,545 | Campbell | June 19, 1934 |
| 2,016,629 | De Andres | Oct. 8, 1935 |
| 2,123,505 | Faries | July 12, 1938 |
| 2,317,984 | Fitch | May 4, 1943 |
| 2,400,661 | Struensee et al. | May 21, 1946 |
| 2,521,727 | Kappen | Sept. 12, 1950 |
| 2,678,139 | Gildersleeve | May 11, 1954 |
| 2,710,105 | Schwartz | June 7, 1955 |